(12) United States Patent
Song et al.

(10) Patent No.: US 11,649,316 B2
(45) Date of Patent: May 16, 2023

(54) COMPOSITION FOR FORMING ENVIRONMENTALLY FRIENDLY POLYURETHANE FOAM AND METHOD FOR MANUFACTURING POLYURETHANE FOAM

(71) Applicant: SAMYANG CORPORATION, Seoul (KR)

(72) Inventors: Gwang Seok Song, Jeonju-si (KR); Seung Hyun Yoo, Daejeon (KR); Hoon Ryu, Daejeon (KR); Hyuk Min Park, Incheon (KR); Jun Seop Im, Daejeon (KR)

(73) Assignee: SAMYANG CORPORATION, Seoul (KR)

( * ) Notice: Subject to any disclaimer, the term of this patent is extended or adjusted under 35 U.S.C. 154(b) by 344 days.

(21) Appl. No.: 16/625,433

(22) PCT Filed: Jun. 22, 2018

(86) PCT No.: PCT/KR2018/007123
§ 371 (c)(1),
(2) Date: Dec. 20, 2019

(87) PCT Pub. No.: WO2018/236192
PCT Pub. Date: Dec. 27, 2018

(65) Prior Publication Data
US 2021/0147609 A1 May 20, 2021

(30) Foreign Application Priority Data

Jun. 22, 2017 (KR) .................. 10-2017-0079066
Jun. 26, 2017 (KR) .................. 10-2017-0080477
Jun. 26, 2017 (KR) .................. 10-2017-0080497

(51) Int. Cl.
| | | |
|---|---|---|
| *C08G 18/10* | (2006.01) | |
| *C08G 18/48* | (2006.01) | |
| *C08G 18/16* | (2006.01) | |
| *C08G 18/18* | (2006.01) | |
| *C08G 18/24* | (2006.01) | |
| *C08J 9/12* | (2006.01) | |

(52) U.S. Cl.
CPC ......... *C08G 18/4812* (2013.01); *C08G 18/10* (2013.01); *C08G 18/165* (2013.01); *C08G 18/1808* (2013.01); *C08G 18/242* (2013.01); *C08J 9/125* (2013.01); *C08G 2110/0008* (2021.01)

(58) Field of Classification Search
CPC ...... C08G 18/10; C08G 18/12; C08G 18/165; C08G 18/1808; C08G 18/2063; C08G 18/242; C08G 18/246; C08G 18/3218; C08G 18/4233; C08G 18/4812; C08G 18/4883; C08G 18/6511; C08G 18/7621; C08G 18/7671; C08G 2110/0008; C08G 2110/005; C08G 2110/0083; C08J 9/125
See application file for complete search history.

(56) References Cited

U.S. PATENT DOCUMENTS

| | | | |
|---|---|---|---|
| 2003/0212244 A1* | 11/2003 | Hayes ................. | C08G 65/405 528/298 |
| 2005/0143549 A1 | 6/2005 | Schijndel et al. | |
| 2010/0130759 A1* | 5/2010 | Gillet .................. | C07D 493/04 549/464 |
| 2014/0336296 A1* | 11/2014 | Kim ...................... | C08G 18/36 521/170 |
| 2015/0148507 A1* | 5/2015 | Gallagher ............. | A61K 47/34 549/304 |
| 2016/0237198 A1 | 8/2016 | Tsukada et al. | |
| 2018/0016385 A1* | 1/2018 | Ryu ....................... | C08G 18/76 |
| 2019/0161574 A1* | 5/2019 | Im ........................ | C09D 167/02 |

FOREIGN PATENT DOCUMENTS

| | | |
|---|---|---|
| CN | 102083656 A | 6/2011 |
| JP | 2010-53157 A | 3/2010 |
| JP | 2013-142128 A | 7/2013 |
| KR | 10-2004-0094867 A | 11/2004 |
| KR | 10-2014-0134044 A | 11/2014 |
| KR | 10-1609116 B1 | 4/2016 |
| KR | 10-2016-0052619 A | 5/2016 |

OTHER PUBLICATIONS

International Search Report (PCT/ISA/210) issued in PCT/KR2018/007123, dated Sep. 19, 2018.

\* cited by examiner

*Primary Examiner* — John M Cooney
(74) *Attorney, Agent, or Firm* — Birch, Stewart, Kolasch & Birch, LLP

(57) ABSTRACT

The present invention relates to a composition for forming an environmentally friendly polyurethane foam, the composition having improved storage stability, air permeability, and anti-oxidation characteristics and to a method for manufacturing a polyurethane foam and, more specifically, to an isocyanate pre-polymer prepared by reaction of a polyisocyanate and a polyol component comprising a bio-polyol, to a composition for forming an environmentally friendly polyurethane foam, the composition having improved storage stability, air permeability, and anti-oxidative characteristics by comprising the pre-polymer as one component, to a method for manufacturing a polyurethane foam using the same, and to an environmentally friendly polyurethane foam manufactured thereby.

19 Claims, 1 Drawing Sheet

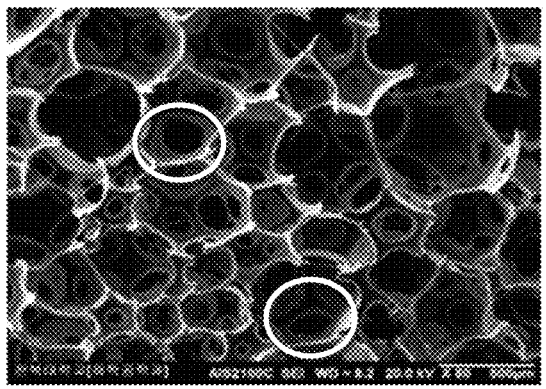 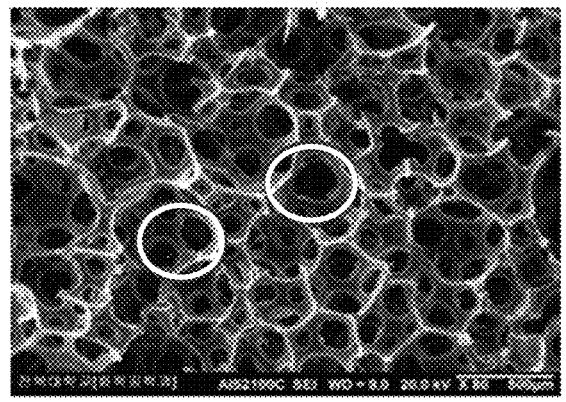
COMPARATIVE EXAMPLE 3B-1        EXAMPLE 3B-1

COMPOSITION FOR FORMING ENVIRONMENTALLY FRIENDLY POLYURETHANE FOAM AND METHOD FOR MANUFACTURING POLYURETHANE FOAM

TECHNICAL FIELD

The present invention relates to a composition for forming an environmentally friendly polyurethane foam having improved storage stability, breathability and anti-oxidation properties, and a method for preparing a polyurethane foam, and more specifically, to an isocyanate prepolymer prepared by reacting a polyol component comprising a bio-polyol with a polyisocyanate and a composition for forming an environmentally friendly polyurethane foam having improved storage stability, breathability and anti-oxidation property by including the same as one component, a method of preparing a polyurethane foam using the same and an environmentally friendly polyurethane foam prepared thereby.

BACKGROUND ART

Polyols and isocyanates, which are essential components of polyurethanes, are usually prepared from petroleum-based raw materials. In particular, polyether polyols and polyester polyols are the most common polyols, and toluene diisocyanate (TDI), hexamethylene diisocyanate (HDI) and methylene diphenyl diisocyanate (MDI) are known as the most common isocyanates. These polyols and isocyanates have a significant impact on the properties of the polyurethanes and their product to be prepared. Their applications are found in a wide variety of industries, such as materials for surface coatings, adhesives, molding and aerospace, automotive, electronics, construction, furniture, green energy and sporting goods. For example, polyol and isocyanate may be used in two-liquid form or prepolymer may be prepared and used in one-liquid form, and they can have a variety of properties and characteristics depending on the intended use.

On the other hand, for a variety of reasons, such as accelerating oil resource depletion, demand for greenhouse gas reductions due to climate change, rising prices of raw material and increasing need for renewable raw materials, in the urethane field there is a need to partially or completely replace the existing petroleum-based raw materials with environmentally friendly components in the polyol such as polyether polyols and polyester polyols prepared from petroleum-based raw materials and isocyanate fields.

Polyols can be produced from renewable biomass such as vegetable natural fats, cellulose and lignin, and bio-polyols derived from vegetable natural oils and fats are already produced on a commercial scale. The physical properties of the produced bio-polyols depend on the type of biomass used in the preparation. In general, castor oil, palm oil and the like are used in the preparation of soft and hard polyurethane and synthetic polyol, and soybean oil is used in the preparation of polyol for soft polyurethane. However, bio-polyols based on biomass currently prepared have a disadvantage of high viscosity.

Little research has been conducted on preparing diisocyanate using biomass. Isocyanates used in industry are aromatics such as TDI, whereas isocyanates based on vegetable oils and fats are essentially aliphatic compounds. Although very high reactivity is required to form the polyurethane foam, aliphatic diisocyanates have the disadvantage of being less reactive than aromatic diisocyanates. In terms of application, polyurethanes utilizing aliphatic diisocyanates are mostly used in coatings. In order to overcome these disadvantages, a bio-isocyanate prepolymer prepared by synthesizing a bio-polyol and an isocyanate, and a method of preparing a polyurethane foam using the same as a component in preparing a polyurethane foam has been developed. However, when using this preparing method, it was confirmed that the viscosity of the bio-polyol was too high, resulting in poor process stability, and precipitation of crystals after preparation of the isocyanate prepolymer caused problems in storage stability.

In addition, Korean Patent Laid-Open Publication No. 10-2015-0123583 discloses a low-density urethane foam composition comprising a bio-polyol made from a biomass resource and diisocyanate. However, a polyurethane foam prepared from this composition has a problem in that yellowing occurs easily due to oxidation.

CONTENTS OF THE INVENTION

Problems to be Solved

The purpose of the present invention is to provide an isocyanate prepolymer prepared by reacting a polyol component comprising an anhydrosugar alcohol-alkylene glycol with a polyisocyanate and a composition for forming an environmentally friendly polyurethane foam having improved storage stability, breathability and anti-oxidation property by including the same as one component, a method of preparing a polyurethane foam using the same and an environmentally friendly polyurethane foam prepared thereby.

Technical Means

In order to achieve the technical purpose, in the first aspect, the present invention provides an isocyanate prepolymer prepared from the reaction of a polyol comprising an anhydrosugar alcohol-alkylene glycol with a polyisocyanate compound, wherein the content of the anhydrosugar alcohol-alkylene glycol is 1 to 100 parts by weight based on 100 parts by weight of the total polyol.

In the second aspect, the present invention provides an isocyanate prepolymer prepared from the reaction of an anhydrosugar alcohol-alkylene glycol with a polyisocyanate compound.

In the third aspect, the present invention provides an isocyanate prepolymer prepared from the reaction of an anhydrosugar alcohol-alkylene glycol; a lactic acid compound or a caprolactone compound; and a polyisocyanate compound.

In the fourth aspect, the present invention provides an isocyanate prepolymer composition comprising a first isocyanate prepolymer prepared from the reaction of a polyol containing an anhydrosugar alcohol-alkylene glycol with a polyisocyanate compound; and a second isocyanate prepolymer prepared from the reaction of a polyol containing a bio-polyol other than anhydrosugar-alkylene glycol with a polyisocyanate compound.

In the fifth aspect, the present invention provides a two-component type composition for forming a polyurethane foam, comprising a polyol premix composition as a first component, and a polyisocyanate as the second component, wherein the polyisocyanate comprises the isocyanate prepolymer or the isocyanate prepolymer composition according to the present invention.

In the sixth aspect, the present invention provides a method for preparing a polyurethane foam, comprising a step of mixing and reacting a polyol premix composition as a first component and a polyisocyanate as a second component, wherein the polyisocyanate comprises the isocyanate prepolymer or the isocyanate prepolymer composition according to the present invention.

In the seventh aspect, the present invention provides a polyurethane roam prepared by mixing and reacting a polyol premix composition as a first component and a polyisocyanate as a second component, wherein the polyisocyanate comprises the isocyanate prepolymer or the isocyanate prepolymer composition according to the present invention.

Effect of the Invention

The isocyanate prepolymer of the present invention not only can realize eco-friendly characteristics using bio-polyols and polyisocyanates as the main raw materials, but also has suitable advantages as a raw material of polyurethane foam that can be applied to various fields. The two-component type composition for forming a polyurethane foam of the present invention comprising the isocyanate prepolymer of the present invention can prevent an increase of viscosity resulting from the bio-polyol and prevent the precipitation of solids from the isocyanate prepolymer during long-term storage, thus providing high storage stability, process stability and productivity, and can obtain improved breathability and anti-oxidation properties, thereby making it possible to prepare an eco-friendly polyurethane foam that can be applied to various fields.

BRIEF DESCRIPTION OF THE FIGURES

FIG. 1 shows a scanning electron micrograph of the internal cell structure of the polyurethane specimen prepared in Comparative Example 3B-1 and Example 3B-1 of the present invention.

CONCRETE MODE FOR CARRYING OUT THE INVENTION

The present invention is explained in more detail below.

The isocyanate prepolymer of the present invention may be prepared from the reaction of a polyol comprising an anhydrosugar alcohol-alkylene glycol with a polyisocyanate compound, wherein the content of the anhydrosugar alcohol-alkylene glycol may be 1 to 100 parts by weight, preferably 1 to 99 parts by weight, more preferably 5 to 70 parts by weight, even more preferably 5 to 50 parts by weight, much more preferably 30 to 50 parts by weight, based on 100 parts by weight of the total polyol. If the content of the anhydrosugar alcohol-alkylene glycol is less than 1 part by weight based on 100 parts by weight of the total polyol, solids may be precipitated from the isocyanate prepolymer during the storage at room temperature, resulting in poor storage stability, and when the polyurethane foam is prepared using this isocyanate prepolymer, foaming of the foam may not be possible, and various properties (hardness, tensile strength, elongation and anti-oxidation properties, etc.) of the polyurethane foam may be deteriorated.

Anhydrosugar alcohols used in the present invention are prepared from hydrogenated sugars derived from natural products.

Hydrogenated sugar (also called "sugar alcohol") refers to a compound obtained by adding hydrogen to a reducing terminal group of a saccharide, generally has the chemical formula of $HOCH_2(CHOH)_nCH_2OH$ (wherein n is an integer of 2 to 5) and is categorized into tetritol, pentitol, hexitol and heptitol (4, 5, 6 and 7 carbon atoms, respectively) according to carbon number.

Among these, hexitol having 6 carbon atoms includes sorbitol, mannitol, iditol, galactitol, and the like, and sorbitol and mannitol are particularly useful substances.

Anhydrosugar alcohols have a diol form having two hydroxyl groups in the molecule and may be prepared using hexitol derived from starch. Anhydrosugar alcohols have been studied for a long time with a lot of interest in that they are environmentally friendly materials derived from renewable natural resources. Among these anhydrosugar alcohols, isosorbide made from sorbitol has the broadest industrial application at present.

The use of anhydrosugar alcohols is very diverse, such as the treatment of heart and vascular diseases, adhesives of patches, drugs such as mouthwashes and the like, solvents of the composition in the cosmetic industry and emulsifiers in the food industry. In addition, it is possible to raise the glass transition temperature of polymer materials such as polyester, PET, polycarbonate, polyurethane, epoxy resin and the like, and improve the strength of these materials, and since they are eco-friendly materials derived from natural products, they are also very useful in the plastics industry such as bioplastics and the like. In addition, it is known that they can be used as an environmentally friendly solvent of adhesives, environmentally friendly plasticizers, biodegradable polymers and water-soluble lacquers. As such, anhydrosugar alcohols are receiving a lot of attention due to their various ways of applicability, and their use in actual industries is also gradually increasing.

In the present invention, as the anhydrosugar alcohol, dianhydrohexitol which is a dehydration product of hexitol may be used, and more preferably isosorbide (1,4-3,6-dianhydrosorbitol), isomannide (1,4-3,6-dianhydromannitol), isoidide (1,4-3,6-dianhydroiditol) or mixtures thereof can be used, but most preferably isosorbide is used.

The anhydrosugar alcohol-alkylene glycol used in the present invention is an adduct obtained by reacting an alkylene oxide with a hydroxyl group(s) at both terminals or one terminal (preferably both terminals) of the anhydrosugar alcohol.

In one embodiment, the alkylene oxide may be linear alkylene oxide of 2 to 8 carbon atoms or branched alkylene oxide of 3 to 8 carbon atoms, more specifically ethylene oxide, propylene oxide or a combination thereof.

In one embodiment, the anhydrosugar alcohol-alkylene glycol may be a compound represented by the following Formula 1.

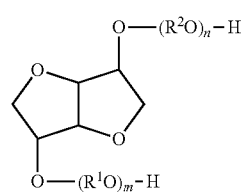

[Formula 1]

In Formula 1, each of $R^1$ and $R^2$ independently represents a linear alkylene group having 2 to 8 carbon atoms or a branched alkylene group having 3 to 8 carbon atoms, each of n and n independently represents an integer of 0 to 15, and m+n represents an integer of 1 to 30.

More preferably, in Formula 1, each of $R^1$ and $R^2$ independently represents an ethylene group, a propylene group or an isopropylene group, preferably $R^1$ and $R^2$ are the same as each other.

each of m and n independently represents an integer of 1 to 14, and m+n represents an integer of 2 to 15.

In one embodiment, as the anhydrosugar alcohol-alkylene glycol, the following isosorbide-propylene glycol, isosorbide-ethylene glycol or a mixture thereof may be used.

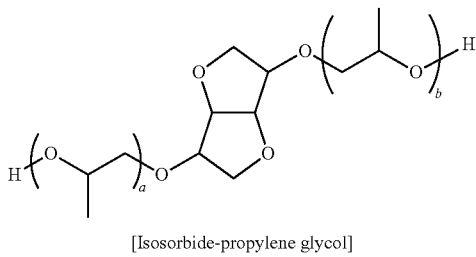

[Isosorbide-propylene glycol]

In the above formula, each of a and b independently represents an integer of 0 to 15, preferably an integer of 1 to 14, and a+b may be an integer from 1 to 30, more preferably an integer from 2 to 15.

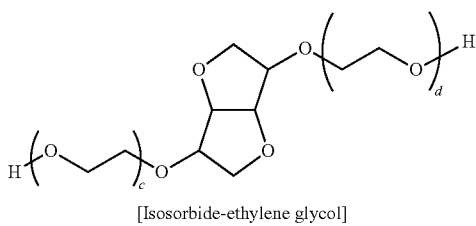

[Isosorbide-ethylene glycol]

In the above formula.

each of c and d independently represents an integer of 0 to 15, preferably an integer of 1 to 14, and c+d may be an integer from 1 to 30, more preferably an integer from 2 to 15.

The polyol component used in the preparation of the isocyanate prepolymer of the present invention may comprise a bio-polyol other than the anhydrosugar alcohol-alkylene glycol, wherein the content of the bio-polyol is based on 100 parts by weight of the total polyol, 1 to 99 parts by weight, more preferably 30 to 95 parts by weight, even more preferably 50 to 95 parts by weight and much more preferably 50 to 70 parts by weight. If the content of the bio-polyol is less than 1 part by weight based on 100 parts by weight of the total polyol, contents of raw materials derived biomass in the isocyanate prepolymer may be reduced, and the eco-friendly improvement effect may be insignificant.

Bio-polyols other than anhydrosugar alcohol-alkylene glycols used in the present invention are dimer acid-based bio-polyols (e.g., Priplast 3192, 3162, 3172, 2033, 1837, 1838, 3238, 1839, 3196, 3187, 3186, 3286, 3188, 3190 and etc. from Croda) or castor oil-based bio-polyols (e.g., BiOH 2100, 2828, 5000, 5100, 5300, 5450, 2300, 2828 and etc. from Cargill, or B-1350, B-1500, EBT-509 and etc. from Mitsui Chemicals & SKC Polyurethanes), but they are not limited thereto.

The polyisocyanate compound to be reacted with the polyol comprising anhydrosugar alcohol-alkylene glycols (preferably polyol mixtures comprising anhydrosugar alcohol-alkylene glycols and bio-polyols other than anhydrosugar alcohol-alkylene glycols) for preparing the isocyanate prepolymer of the present invention may be used without particular limitation as long as it can be used for producing polyurethane foam. Thus, for example, polyisocyanates selected from aliphatic polyisocyanates, cycloaliphatic polyisocyanates, araliphatic polyisocyanates, aromatic polyisocyanates, heterocyclic polyisocyanates or combinations thereof can be used, and also unmodified polyisocyanates or modified polyisocyanates may be used.

Specifically, the polyisocyanate may be selected from the group consisting of methylene diisocyanate, ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3-diisocyanate, cyclohexane-1,4-diisocyanate, isophorone diisocyanate, 2,4-hexahydrotoluene diisocyanate, 2,6-hexahydrotoluene diisocyanate, dicyclohexylmethane-4,4'-diisocyanate (HMDI), 1,3-phenylene diisocyanate, 1,4-phenylene diisocyanate, 2,4-toluene diisocyanate, 2,6-toluene diisocyanate, diphenylmethane-2,4'-diisocyanate, diphenylmethane-4,4'-diisocyanate, polydiphenylmethane diisocyanate (PMDI), naphthalene-1,5-diisocyanate or a combination thereof. In one embodiment, toluene diisocyanate mixed with 2,4-toluene diisocyanate and 2,6-toluene diisocyanate (isomer ratio of 2,4-/2,6-=80/20) may be used as the polyisocyanate.

In the present invention, the amount of polyisocyanate used is preferably in an amount of 70 to 130 in the isocyanate index (NCO index), particularly preferably in an amount of 80 to 120, even more preferably in an amount of 100 to 120. The isocyanate index is the ratio of the number of equivalents of hydroxyl groups present in the polyol and the number of equivalents of isocyanate in the urethane reactant, and refers to the amount of isocyanate used relative to the theoretical equivalent. If the isocyanate index is less than 100, it means that there is an excess of polyol, and if the isocyanate index is more than 100, it means that there is an excess of isocyanate. If the isocyanate index is less than 70, there is a problem in that the gelling reaction is delayed due to poor reactivity, and if the isocyanate index exceeds 130, there is a problem in that the hard segment is excessively increased and shrinkage occurs.

In another aspect of the present invention, the present invention provides an isocyanate prepolymer prepared from the reaction of an anhydrosugar alcohol-alkylene glycol with a polyisocyanate compound.

In the isocyanate prepolymer, the anhydrosugar alcohol-alkylene glycol and the polyisocyanate compound are the same as described above.

In another aspect of the present invention, the present invention provides an isocyanate prepolymer prepared from the reaction of an anhydrosugar alcohol-alkylene glycol; a lactic acid compound or a caprolactone compound; and a polyisocyanate compound.

In the isocyanate prepolymer, the anhydrosugar alcohol-alkylene glycol and the polyisocyanate compound are the same as described above.

The description of the anhydrosugar alcohol-alkylene glycol and the polyisocyanate compound is the same as described above.

As the lactic acid compound used to prepare the isocyanate prepolymer of the present invention, lactic acid, lactic acid oligomers or lactide (L-lactide, D-lactide or D,L-lactide) and the like can be used, and as the caprolactone compounds, ε-caprolactone and etc. may be used, but they are not limited thereto.

In addition, although not particularly limited, in the preparation of the isocyanate prepolymer of the present invention, the lactic acid compound or caprolactone compound is first reacted with anhydrosugar alcohol-alkylene glycol to prepare anhydrosugar alcohol-alkylene glycol-derived lactate derivative or anhydrosugar alcohol-alkylene glycol-derived caprolactate derivative, which reacts with the polyisocyanate compound to prepare the isocyanate prepolymer of the present invention.

When preparing an anhydrosugar alcohol-alkylene glycol-derived lactate derivative or an anhydrosugar alcohol-alkylene glycol-derived caprolactate derivative, the reaction molar ratio of the anhydrosugar alcohol-alkylene glycol and the lactic acid compound or the caprolactone compound is from 1:2 to 1:20, but is not limited thereto. When the reaction proceeds at the above reaction molar ratio, —OH remains at both terminals of the derivatives, so that contents of raw materials derived biomass in the lactic acid compound or the caprolactone compound is increased, therefore it may be possible to prepare lactate derivatives or caprolactate derivatives in the form of diols with improved environmental friendliness.

In the case of preparing anhydrosugar alcohol-alkylene glycol-derived lactate derivative or anhydrosugar alcohol-alkylene glycol-derived caprolactate derivative by first reacting anhydrosugar alcohol-alkylene glycol with a lactic acid compound or a caprolactone compound, an organometallic catalyst, preferably an organotin catalyst (e.g., stannous octoate) may be used in the preparation reaction, but is not limited thereto, and the content of the organometallic catalyst is 0.001% to 0.01% by weight or 0.001% to 0.005% by weight of the total amount of the reaction mixture, but is not particularly limited thereto.

In another aspect of the present invention, the present invention provides an isocyanate prepolymer composition comprising, a first isocyanate prepolymer prepared from the reaction of a polyol containing an anhydrosugar alcohol-alkylene glycol with a polyisocyanate compound; and a second isocyanate prepolymer prepared from the reaction of a polyol containing a bio-polyol other than anhydrosugar-alkylene glycol with a polyisocyanate compound.

In the isocyanate prepolymer composition of the present invention, the content of the first isocyanate prepolymer may be 1 to 99 parts by weight, more preferably 5 to 70 parts by weight, even more preferably 5 to 50 parts by weight, much more preferably 30 to 50 parts by weight based on 100 parts by weight of the total amount of the first isocyanate prepolymer and the second isocyanate prepolymer. If the content of the first isocyanate prepolymer is less than 1 part by weight based on 100 parts by weight of the total amount of the first isocyanate prepolymer and the second isocyanate prepolymer, solids may be precipitated from the isocyanate prepolymer during the storage at room temperature, resulting in poor storage stability, and when the polyurethane foam is prepared using this, foaming of the foam may be impossible, and various properties (hardness, tensile strength, elongation and anti-oxidation properties, etc.) of the polyurethane foam may be deteriorated. If the content of the first isocyanate prepolymer exceeds 99 parts by weight, contents of raw materials derived biomass in the isocyanate prepolymer is reduced and the effect of improving the environmental friendliness may be insignificant.

In the isocyanate prepolymer composition, the anhydrosugar alcohol-alkylene glycol, bio-polyol, and polyisocyanate are the same as described above.

In another aspect of the present invention, the present invention provides a two-component type composition for forming a polyurethane foam, comprising a polyol premix composition as a first component; and a polyisocyanate as the second component, wherein the polyisocyanate comprises the aforementioned isocyanate prepolymer or the isocyanate prepolymer composition.

The polyol premix composition comprised as a first component in the two-component type composition for forming a polyurethane foam of the present invention comprises a polyol, a catalyst, a surfactant and a blowing agent.

The polyol comprised in the polyol premix composition of the present invention may comprise a polyol commonly used in the production of polyurethane foams, having an average active hydrogen number of 2 or more (preferably 2 to 4) and an active hydrogen equivalent of 600 to 7,000. More specifically, the one selected from the group consisting of a polyether polyol, polyester polyol, the polymer polyol obtained by polymerizing the above polyol and a vinyl compound, and a combination thereof can be used. According to one embodiment, polyether polyols or polyether polymer polyols obtained by polymerizing a polyether polyol and a vinyl compound can be preferably used.

The polyols may be used alone or in combination, and preferably, a polymer polyol may be used to control physical properties of the flexible polyurethane foam. For example, a polyether polymer polyol may be obtained in the form of a stable suspension by grafting polyvinyl filler to a polyether polyol. Vinyl compounds usable for the preparing of polymer polyols include acrylonitrile, styrene monomer, methylmethacrylonitrile and the like. Preferably, acrylonitrile may be used alone or in admixture with a styrene monomer. The content of the vinyl compound in the polymer polyol may be 20 to 50% by weight.

As the catalyst comprised in the polyol premix composition of the present invention, an organometallic catalyst, an amine catalyst or a combination thereof may be used.

An organometallic catalyst commonly used in the preparing of polyurethane foam may be used. For example, an organotin catalyst (more specifically, dibutyltin dilaurate (DBTDL) or tin bis [2-ethyl hexanoate]) may be used, but it is not limited thereto.

The amine catalyst used in the present invention serves to promote the reaction between the polyol of the first component and the isocyanate prepolymer of the second component. In the present invention, the type of the amine catalyst is not particularly limited, but preferably the amine catalyst may be used in the form of one kind or in the form of mixture of two or more kinds in the tertiary amine catalysts, and more specifically, the one selected from the group consisting of triethylene diamine, triethylamine, N-Methyl morpholine, N-Ethyl morpholine or a combination thereof may be used.

In the polyol premix composition of the present invention, based on 100 parts by weight of the polyol, each of the organometallic catalyst and the amine catalyst may be independently comprised in an amount of 0.01 to 5 parts by weight, and more preferably 0.1 to 2.5 parts by weight. If the amount of these catalysts is too small, the reaction may be delayed, causing curing failure or a fall-off during foam formation. On the contrary, if the amount is too high, the reaction may be too fast or shrinkage may occur.

The surfactant used in the present invention serves to prevent the resulting cells from coalescing or breaking down when the cells are formed inside the polyurethane foam, and to adjust the formation of cells having a uniform shape and size. In the present invention, the surfactant can be used without particular limitation as long as it is conventionally used in the preparing of polyurethane foam—for example, a silicone-based surfactant may be generally used. The silicone-based surfactant may be at least one selected from silicone oils and derivatives thereof, and specifically, may be a polyalkylene oxide methylsiloxane copolymer.

In the polyol premix composition of the present invention, a surfactant may be comprised in an amount of 0.01 to 5 parts by weight and more preferably 0.1 to 2 parts by weight based on 100 parts by weight of the polyol. If the amount of surfactant is too small, there may be a problem in that the molding of the foam is non-uniform. On the contrary, if the amount of the surfactant is too large, shrinkage of the foam may occur.

As the blowing agent used in the present invention, in consideration of various physical properties of the required foam, etc., a known blowing agent conventionally used for preparing a flexible polyurethane foam can be appropriately selected and used. In the present invention, as the blowing agent, water may be representatively used, and in addition, the one selected from the group consisting of methylene chloride, n-butane, isobutane, n-pentane, isopentane, dimethylether, acetone, carbon dioxide or a combination thereof may be used. These blowing agents can be suitably used in accordance with known methods of use and in accordance with the required density and other properties of the foam.

The amount of the blowing agent in the polyol premix composition of the present invention is not particularly limited—for example, 0.1 to 30 parts by weight, more specifically 0.5 to 25 parts by weight of the blowing agent may be used based on 100 parts by weight of the polyol, but it is not limited thereto. According to one embodiment of the present invention, as a blowing agent based on 100 parts by weight of polyol, 0.8 to 5.0 parts by weight of water alone, or a mixture of this and 0.1 to 18 parts by weight of methylene chloride may be used.

The polyisocyanate which is the second component comprised in the two-component type composition for forming a polyurethane foam of the present invention may comprise the above-mentioned isocyanate prepolymer or isocyanate prepolymer composition and other poly isocyanate compounds, which may be the same as the above-mentioned polyisocyanate compound used for the preparation of the isocyanate prepolymer.

The first component or the second component comprised in the two-component type composition for forming a polyurethane foam of the present invention may further comprise an auxiliary additive selected from the group consisting of a flame retardant, a colorant, a UV stabilizer, a thickener, a foam stabilizer, a filler or a combination thereof, in addition to the above components.

In the two-component type composition for forming a polyurethane foam of the present invention, the first component and the second component may be present individually without contact, and they may be mixed immediately before use or in situ.

In another aspect of the present invention, the present invention provides a method for preparing a polyurethane foam, comprising a step of mixing and reacting a polyol premix composition as a first component and a polyisocyanate as a second component, wherein the polyisocyanate comprises the aforementioned isocyanate prepolymer or the isocyanate prepolymer composition, and a polyurethane foam prepared thereby—for example, a flexible polyurethane foam.

In the preparation of the polyurethane foam, a polyisocyanate as a second component may be added to a polyol premix composition as a first component of the present invention and stirred, and then the mixture may be added to a mold to allow curing and foaming to proceed to prepare a polyurethane foam.

There is no particular limitation on the equipment or conditions (temperature, time and etc.) used for the preparation of the polyurethane foam, and the equipment or conditions generally adopted may be used as they are or as appropriately modified.

In one embodiment, the polyurethane foam may be cured at high temperatures due to the heat of urethane foaming reaction, preferably from 100° C. to 180° C. or from 120° C. to 180° C. more preferably from 160° C. to 180° C. but the temperature is not limited to this.

The present invention is explained in more detail through the following Examples and Comparative Examples. However, the scope of the present invention is not limited thereby in any manner.

EXAMPLES

I. Preparation of an Isocyanate Prepolymer Prepared from Reaction of Polyol Comprising an Anhydrosugar Alcohol-Alkylene Glycol with a Polyisocyanate Compound and a Two-Component Type Composition for Forming a Polyurethane Foam Preparation of an Isocyanate Prepolymer Example 1A-1

By using 100 parts by weight of a polyol mixture mixed at a weight ratio of 50:50 of dimer acids-based difunctional bio-polyol (trade name: Priplast 1838, manufacturer: Croda, molecular weight: 2,000, contents of raw materials derived biomass: 83% by weight) and ethylene oxide 5 mole adduct of isosorbide (trade name: IC52, manufacturer: IC Chemical, molecular weight: 365.47) and 368 parts by weight of toluene diisocyanate (TDI) as polyisocyanate, the reaction was conducted at 60° C. for 2 hours under the condition of adjusting the NCO content to 35 to prepare an isocyanate prepolymer. The prepared isocyanate prepolymer was transferred to a 30 ml vial bottle, stored in an oven at 25° C. for 1 month, and then whether a white solid precipitated was confirmed. The result is shown in Table 1 below.

Example 1A-2

By using 100 parts by weight of a polyol mixture mixed at a weight ratio of 60:40 of dimer acids-based difunctional bio-polyol (trade name: Priplast 3196, manufacturer: Croda, molecular weight: 3,000, contents of raw materials derived biomass: 82% by weight) and ethylene oxide 10 mole adduct of isosorbide (trade name: IC102, manufacturer: IC Chemical, molecular weight: 578.05) and 321 parts by weight of TDI as polyisocyanate, the reaction was conducted at 70° C. for 1.5 hours under the condition of adjusting the NCO content to 35 to prepare an isocyanate prepolymer. The prepared isocyanate prepolymer was transferred to a 30 ml vial bottle, stored in an oven at 25° C. for 1 month, and then whether a white solid precipitated was confirmed. The result is shown in Table 1 below.

Example 1A-3

By using 100 parts by weight of a polyol mixture mixed at a weight ratio of 50:50 of dimer acids-based difunctional bio-polyol (trade name: Priplast 3238, manufacturer: Croda, molecular weight: 3,000, contents of raw materials derived biomass: 100% by weight) and propylene oxide 5 mole adduct of isosorbide (trade name: IC59, manufacturer: IC Chemical, molecular weight: 432.37) and 480 parts by weight of TDI as polyisocyanate, the reaction was conducted at 60° C. for 2 hours under the condition of adjusting the NCO content to 35 to prepare an isocyanate prepolymer. The prepared isocyanate prepolymer was transferred to a 30 ml vial bottle, stored in an oven at 25° C. for 1 month, and then whether a white solid precipitated was confirmed. The result is shown in Table 1 below.

Example 1A-4

By using 100 parts by weight of a polyol mixture mixed at a weight ratio of 70:30 of castor oil-based trifunctional bio-polyol (trade name: EBT-509, manufacturer: Mitsui Chemicals & SKC Polyurethanes, molecular weight: 2.500) and propylene oxide 8 mole adduct of isosorbide (trade name: IC89, manufacturer: IC Chemical, molecular weight: 618.52) and 618 parts by weight of methylenediphenyl diisocyanate (MDI) as polyisocyanate, the reaction was conducted at 60° C. for 2 hours under the condition of adjusting the NCO content to 28 to prepare an isocyanate prepolymer. The prepared isocyanate prepolymer was transferred to a 30 ml vial bottle, stored in an oven at 25° C. for 1 month, and then whether a white solid precipitated was confirmed. The result is shown in Table 1 below.

Example 1A-5

By using 100 parts by weight of dimer acid-based bifunctional bio-polyol (trade name: Priplast 1838, manufacturer: Croda, molecular weight: 2,000, contents of raw materials derived biomass: 83% by weight) and 575 parts by weight of MDI as polyisocyanate, the reaction was conducted at 60° C. for 2 hours under the condition of adjusting the NCO content to 28 to prepare a first isocyanate prepolymer.

In addition, by using 100 parts by weight of ethylene oxide 5 mole adduct of isosorbide (trade name: IC52, manufacturer: IC Chemical, molecular weight: 365.47) and 911 parts by weight of MDI as polyisocyanate, the reaction was conducted at 60° C. for 2 hours under the condition of adjusting the NCO content to 28 to prepare a second isocyanate prepolymer.

Thereafter, the prepared first isocyanate prepolymer and the second isocyanate prepolymer were mixed at a weight ratio of 50:50 to prepare an isocyanate prepolymer composition. The isocyanate prepolymer composition was transferred to a 30 ml vial bottle, stored in an oven at 25° C. for 1 month, and then whether a white solid precipitated was confirmed. The result is shown in Table 1 below.

Example 1A-6

By using 100 parts by weight of dimer acid-based bifunctional bio-polyol (trade name: Priplast 3196, manufacturer: Croda, molecular weight: 3,000, contents of raw materials derived biomass: 82% by weight) and 581 parts by weight of MDI as polyisocyanate, the reaction was conducted at 60° C. for 2 hours under the condition of adjusting the NCO content to 28 to prepare a first isocyanate prepolymer.

In addition, by using 100 parts by weight of ethylene oxide 10 mole adduct of isosorbide (trade name: IC102, manufacturer: IC Chemical, molecular weight: 578.05) and 802 parts by weight of MDI as polyisocyanate, the reaction was conducted at 60° C. for 2 hours under the condition of adjusting the NCO content to 28 to prepare a second isocyanate prepolymer.

Thereafter, the prepared first isocyanate prepolymer and the second isocyanate prepolymer were mixed at a weight ratio of 50:50 to prepare an isocyanate prepolymer composition. The isocyanate prepolymer composition was transferred to a 30 ml vial bottle, stored in an oven at 25° C. for 1 month, and then whether a white solid precipitated was confirmed. The result is shown in Table 1 below.

Example 1A-7

By using 100 parts by weight of dimer acid-based bifunctional bio-polyol (trade name: Priplast 1838, manufacturer: Croda, molecular weight: 2,000, contents of raw materials derived biomass: 83% by weight) and 413 parts by weight of TDI as polyisocyanate, the reaction was conducted at 60° C. for 2 hours under the condition of adjusting the NCO content to 35 to prepare a first isocyanate prepolymer.

In addition, by using 100 parts by weight of ethylene oxide 5 mole adduct of isosorbide (trade name: IC52, manufacturer: IC Chemical, molecular weight: 365.47) and 597 parts by weight of TDI as polyisocyanate, the reaction was conducted at 60° C. for 2 hours under the condition of adjusting the NCO content to 35 to prepare a second isocyanate prepolymer.

Thereafter, the prepared first isocyanate prepolymer and the second isocyanate prepolymer were mixed at a weight ratio of 99:1 to prepare an isocyanate prepolymer composition. The isocyanate prepolymer composition was transferred to a 30 ml vial bottle, stored in an oven at 25° C. for 1 month, and then whether a white solid precipitated was confirmed. The result is shown in Table 1 below.

Example 1A-8

By using 100 parts by weight of ethylene oxide 5 mole adduct of isosorbide (trade name: IC52, manufacturer: IC Chemical, molecular weight: 365.47) and 911 parts by weight of MDI as polyisocyanate, the reaction was conducted at 60° C. for 2 hours under the condition of adjusting the NCO content to 28 to prepare an isocyanate prepolymer. The prepared isocyanate prepolymer was transferred to a 30 ml vial bottle, stored in an oven at 25° C. for 1 month, and then whether a white solid precipitated was confirmed. The result is shown in Table 1 below.

Comparative Example 1A-1

By using 100 parts by weight of dimer acids-based difunctional bio-polyol (trade name: Priplast 1838, manufacturer: Croda, molecular weight: 2,000, contents of raw materials derived biomass: 83% by weight) and 296 parts by weight of TDI as polyisocyanate, the reaction was conducted at 60° C. for 2 hours under the condition of adjusting the NCO content to 35 to prepare an isocyanate prepolymer. The prepared isocyanate prepolymer was transferred to a 30 ml vial bottle, stored in an oven at 25° C. for 1 month, and then whether a white solid precipitated was confirmed. The result is shown in Table 1 below.

Comparative Example 1A-2

By using 100 parts by weight of dimer acids-based difunctional bio-polyol (trade name: Priplast 3238, manufacturer: Croda, molecular weight: 3.000, contents of raw materials derived biomass: 100% by weight) and 286 parts by weight of TDI as polyisocyanate, the reaction was conducted at 60° C. for 2 hours under the condition of adjusting the NCO content to 35 to prepare an isocyanate prepolymer. The prepared isocyanate prepolymer was transferred to a 30 ml vial bottle, stored in an oven at 25° C. for 1 month, and then whether a white solid precipitated was confirmed. The result is shown in Table 1 below.

Comparative Example 1A-3

By using 100 parts by weight of castor oil-based trifunctional bio-polyol (trade name: EBT-509, manufacturer: Mitsui chemicals & SKC Polyurethanes, molecular weight: 2,500) and 563 parts by weight of MDI as polyisocyanate, the reaction was conducted at 60° C. for 2 hours under the condition of adjusting the NCO content to 28 to prepare an isocyanate prepolymer. The prepared isocyanate prepolymer was transferred to a 30 ml vial bottle, stored in an oven at 25° C. for 1 month, and then whether a white solid precipitated was confirmed. The result is shown in Table 1 below.

Comparative Example 1A-4

By using 100 parts by weight of dimer acid-based bifunctional bio-polyol (trade name: Priplast 3196, manufacturer: Croda, molecular weight: 3,000, contents of raw materials derived biomass: 82% by weight) and 399 parts by weight of TDI as polyisocyanate, the reaction was conducted at 60° C. for 2 hours under the condition of adjusting the NCO content to 35 to prepare a first isocyanate prepolymer.

In addition, by using 100 parts by weight of ethylene oxide 10 mole adduct of isosorbide (trade name: IC102, manufacturer: IC Chemical, molecular weight: 578.05) and 375 parts by weight of TDI as polyisocyanate, the reaction was conducted at 60° C. for 2 hours under the condition of adjusting the NCO content to 35 to prepare a second isocyanate prepolymer.

Thereafter, the prepared first isocyanate prepolymer and the second isocyanate prepolymer were mixed at a weight ratio of 99.5:0.5 to prepare an isocyanate prepolymer composition. The isocyanate prepolymer composition was transferred to a 30 ml vial bottle, stored in an oven at 25° C. for 1 month, and then whether a white solid precipitated was confirmed. The result is shown in Table 1 below.

TABLE 1

| Categories | Bio-polyol (parts by weight) | Isosorbide-alkylene glycol (parts by weight) | Isocyanate (parts by weight) | Appearance at room temperature |
|---|---|---|---|---|
| Example 1A-1 | Priplast 1838 (50) | IC52 (50) | TDI (368) | Liquid, no solid precipitation |
| Example 1A-2 | Priplast 3196 (60) | IC102 (40) | TDI (321) | Liquid, no solid precipitation |
| Example 1A-3 | Priplast 3238 (50) | IC59 (50) | TDI (480) | Liquid, no solid precipitation |
| Example 1A-4 | EBT-509 (70) | IC89 (30) | MDI (618) | Liquid, no solid precipitation |
| Example 1A-5 | Priplast 1838 (50) | IC52 (50) | MDI (744) | Liquid, no solid precipitation |
| Example 1A-6 | Priplast 3196 (50) | IC102 (50) | MDI (692) | Liquid, no solid precipitation |
| Example 1A-7 | Priplast 1838 (99) | IC52 (1) | TDI (415) | Liquid, no solid precipitation |
| Example 1A-8 | — | IC52 (100) | MDI (911) | Liquid, no solid precipitation |
| Comparative Example 1A-1 | Priplast 1838 (100) | — | TDI (296) | Solid precipitate after 5 days |
| Comparative Example 1A-2 | Priplast 3238 (100) | — | TDI (286) | Solid precipitate after 2 days |
| Comparative Example 1A-3 | EBT-509 (100) | — | MDI (563) | Solid precipitate after 1 day |
| Comparative Example 1A-4 | Priplast 3196 (99.5) | IC102 (0.5) | TDI (287) | Solid precipitate after 5 days |

The contents of the bio-polyol, isosorbide-alkylene glycol and isocyanate refer to the content in the total amount of isocyanate prepolymer prepared or the total amount of isocyanate prepolymer mixture.

As shown in Table 1, in the cases of Examples 1A-1 to 1A-8, by using the content of isosorbide-alkylene glycol in an amount of 1 part by weight to 100 parts by weight based on 100 parts by weight of the bio-polyol, isosorbide-alkylene glycol functions as a stabilizer in the isocyanate prepolymer. Therefore, no solid precipitation of isocyanate prepolymers was observed even after prolonged storage (I month) at room temperature.

However, in the cases of Comparative Examples 1A-1 to 1A-3 where isosorbide-alkylene glycol was not used, there is no isosorbide-alkylene glycol to be stabilized in the isosorbide prepolymer, so when stored at room temperature, solid precipitation of isocyanate prepolymers was observed after 1 day, after 2 days or after 5 days. In addition, in the case of Comparative Example 1A-4, since the content of isosorbide-alkylene glycol was used in less than 1 part by weight based on 100 parts by weight of the bio-polyol, there was no improvement in storage stability, and solid precipitation was observed after 5 days. In the case of the isocyanate prepolymers of Comparative Examples A-1 to 1A-4, a solid precipitated, making it impossible to use as an isocyanate component for preparing polyurethane foam.

Preparing of Polyurethane Foam

Examples 1B-1 to 1B-10 and Comparative Examples 1B-1 to 1B-6

According to the components and the content ratios shown in Tables 2 and 3 below, the polyol, the catalyst, the surfactant and the blowing agent were mixed and thoroughly stirred for 1 to 3 minutes at a stirring speed of 3,000 rpm to form a polyol premix composition which is a first component of the two-component type composition for forming a polyurethane foam of the present invention.

A polyisocyanate component as a second component was added to the prepared polyol premix composition, followed by stirring at a stirring speed of 3,000 rpm for 7 to 10 seconds to prepare a two-component type composition for forming a polyurethane foam of the present invention.

A polyethylene film was laid in a box mold having a square of 250 mm×250 mm, and the polyurethane foam-forming composition prepared above was poured thereon. At this time, the reaction time was measured and recorded using a second clock to measure the cream time, the maximum volume rise time and the gel time, and the health bubbles were observed. The heat of hardening reaction of the polyurethane foam was confirmed by the rod thermometer, therefrom it was confirmed that the heat of hardening reaction was 120° C.

Then, the physical properties of the prepared foam specimens were measured by the following evaluation method. The results are shown in Tables 2 and 3, respectively.

[Used Ingredients]
1) Polyol
TF-3000: Polyol other than anhydrosugar alcohols, tri-functional polyether polyols having an active hydrogen equivalent of 3,000 and a hydroxyl value of 54 to 58 mgKOH/g (Mitsui Chemicals & SKC Polyurethanes, TF-3000)
2) Amine-Based Catalyst
L-33: amine-based catalyst, Triethylenediamine/dipropylene glycol solution at 67 wt % concentration (TEDA L-33 from Tosoh Corporation)
3) Organometallic Catalyst
DBTDL: Organometallic Catalyst, Dibutyltin Dilaurate (Sigma Aldrich)
4) Silicone Surfactant
L-580K: Polyalkylene oxide methylsiloxane copolymer, Niax L-580K from Momentive
5) Blowing Agent
Water
6) Polyisocyanate Component
① T-80 (Comparative Example)
Toluene diisocyanate (TDI) (isomer ratio of 2,4-/2,6-=80:20), Rutlanate T-80 from BASF, Korea
② MDI: 4,4-methylenediphenyl diisocyanate (Lupranate ME from BASF, Korea)
③ Example 1A-1: Isocyanate prepolymer prepared in Example 1A-1
④ Example 1A-2: Isocyanate prepolymer prepared in Example 1A-2
⑤ Example 1A-5: Isocyanate prepolymer prepared in Example 1A-5
⑥ Example 1A-6: Isocyanate prepolymer prepared in Example 1A-6
⑦ Example 1A-7: Isocyanate prepolymer prepared in Example 1A-7
⑧ Example 1A-8: Isocyanate prepolymer prepared in Example 1A-8
⑨ Comparative Example 1A-1: Isocyanate prepolymer prepared in Comparative Example 1A-1
⑩ Comparative Example 1A-2: isocyanate prepolymer prepared in Comparative Example 1A-2
⑪ Comparative Example 1A-3: Isocyanate prepolymer prepared in Comparative Example 1A-3
⑫ Comparative Example 1A-4: Isocyanate prepolymer prepared in Comparative Example 1A-4
7) Crosslinking Agent
Ethylene glycol (Sigma Aldrich)

A description of the physical properties described in Table 2 and Table 3 is as follows.

Cream time (seconds): shows the time taken from when the polyurethane foam stock solution is mixed until the stock solution starts to swell, and it is important to find a balance because it is the part that finds optimum reactivity. The fast and slow of the cream time is not important, but the short cream time is preferable because the longer cream time can result in irregular foam formation (or cell formation). However, too short a cream time may result in poor mixing, so a suitable cream time (e.g., 7 to 14 seconds) is required.

Rise time (seconds): shows the time taken from when polyurethane foam stock solution is mixed until the stock solution reaches to the maximum swelling of the foam. Rise time is the part that finds optimum reactivity, and it is important to balance between gelling and blowing, so it is hard to say good or bad just because of the fast and slow rise time. If the rise time is fast, the foam collapses (decayed before the foamed foam hardens, usually due to an incorrect stock solution ratio or insufficient mixing of raw materials), and if it is too slow, foaming may not be possible due to gelling (foaming of foam is stopped) during foaming. Therefore, a suitable rise time (e.g., 108 seconds to 124 seconds) is required. "Unmeasurable" of rise time means that the composition (stock solution) does not swell and no foam is formed.

Health bubble: shows small bubbles that burst on the surface of the foam immediately after swelling to the maximum, and the presence of health bubble means that foam foaming is correct.

Foam state:
1) Good: The foam is blown (swollen), and it refers to a condition in which no collapse, cracks (cracking inside the foam due to the formation of the foam or external conditions after the formation) or shrinkages (a phenomenon wherein the gas trapped inside the foam is reduced to its original size by cooling) are apparent due to the gelling.
2) Bad: The foam does not form due to the bursting of cells while the foam is blowing.

Molding density: Measured according to ASTM D 1621.
Hardness: Measured according to KS M 6672.
Tensile strength: Measured according to KS M 6518.
Elongation: Measured according to KS M 6518.
Y1 value: Measured according to ASTM E313-96. The lower the Y1 value, the lower the yellowing phenomenon, and the better the anti-oxidation property.

TABLE 2

| | | | Comparative Example | | | | Example | | | | |
|---|---|---|---|---|---|---|---|---|---|---|---|
| Categories | | | 1B-1 | 1B-2 | 1B-3 | 1B-4 | 1B-1 | 1B-2 | 1B-3 | 1B-4 | 1B-5 |
| Component (parts by weight) | Polyol | TF-3000 | 100 | 100 | 100 | 100 | 100 | 100 | 100 | 100 | 100 |
| | Surfactant | L-580K | 1.7 | 1.7 | 1.7 | 1.7 | 1.7 | 1.7 | 1.7 | 1.7 | 1.7 |
| | Catalyst | L-33 | 0.4 | 0.4 | 0.4 | 0.4 | 0.4 | 0.4 | 0.4 | 0.4 | 0.4 |
| | | DBTDL | 0.18 | 0.18 | 0.18 | 0.18 | 0.18 | 0.18 | 0.18 | 0.18 | 0.18 |

TABLE 2-continued

|  | Categories | Comparative Example | | | | Example | | | | |
| --- | --- | --- | --- | --- | --- | --- | --- | --- | --- | --- |
|  |  | 1B-1 | 1B-2 | 1B-3 | 1B-4 | 1B-1 | 1B-2 | 1B-3 | 1B-4 | 1B-5 |
| Blowing agent | Water | 3.6 | 3.6 | 3.6 | 3.6 | 3.6 | 3.6 | 3.6 | 3.6 | 3.6 |
| Isocyanate | T-80 | 50.3 | — | — | — | 25.1 | — | 25.1 | — | — |
|  | Comparative Example 1A-1 | — | 59.6 | — | — | — | — | — | — | — |
|  | Comparative Example 1A-2 | — | — | 59.6 | — | — | — | — | — | — |
|  | Comparative Example 1A-4 | — | — | — | 59.6 | — | — | — | — | — |
|  | Example 1A-1 | — | — | — | — | 34.5 | 69.0 | — | — | — |
|  | Example 1A-2 | — | — | — | — | — | — | 34.5 | 75.8 | — |
|  | Example 1A-7 | — | — | — | — | — | — | — | — | 69.4 |
| Properties | Isocyanate Index | 115 | 115 | 115 | 115 | 115 | 115 | 115 | 115 | 115 |
|  | Cream Time (sec) | 11 | 12 | 11 | 11 | 12 | 11 | 12 | 11 | 12 |
|  | Rise time (sec) | 116 | 120 | 122 | 120 | 120 | 124 | 121 | 124 | 123 |
|  | Density (kg/cm$^3$) | 26.5 | 32.51 | 33.28 | 36.21 | 28.3 | 31.1 | 28.0 | 32.3 | 31.1 |
|  | Health bubble | Present | No present | No present | No present | Present | Present | Present | Present | Present |
|  | Foam state | Good | Bad | Bad | Bad | Good | Good | Good | Good | Good |
|  | Hardness (25% · CLD)(kgf) | 10.0 | Unmeasurable | Unmeasurable | Unmeasurable | 10.9 | 13.2 | 11.0 | 12.9 | 12.5 |
|  | Tensile strength (kgf/cm$^2$) | 1.15 | Unmeasurable | Unmeasurable | Unmeasurable | 1.05 | 1.15 | 1.0 | 1.2 | 1.15 |
|  | Elongation (%) | 200 | Unmeasurable | Unmeasurable | Unmeasurable | 230 | 200 | 210 | 210 | 210 |
|  | YI Value | 21.94 | 22.45 | 23.45 | 22.86 | 20.69 | 15.58 | 16.43 | 15.71 | 20.84 |

The polyurethane foam specimens of Comparative Examples 1B-1 to 1B-4 are the polyurethane foam specimens foamed by using isocyanate prepolymer that use TDI which is a petroleum isocyanate as the isocyanate component (Comparative Example 1B-1), or using isocyanate prepolymers formed by reacting TDI with bio-polyol that contain no anhydrosugar alcohol-alkylene glycol or less than 1 part by weight of anhydrosugar-alkylene glycol (Comparative Examples 1B-2 to 1B-4). The polyurethane foam specimens of Examples 1B-1 to 1B-5 are the polyurethane foam specimens foamed by using isocyanate prepolymer alone prepared by reacting TDI with a bio-polyol containing 1 part by weight or more of anhydrosugar alcohol-alkylene glycol as an isocyanate component (Examples 1B-2, 1B-4 and 1B-5), or using a mixture of the isocyanate prepolymer and TDI (Examples 1B-1 and 1B-3).

In Comparative Example 1B-1 using TDI which is petroleum isocyanate as an isocyanate component, the foam state and physical properties of the polyurethane foam were good, but yellowing occurred due to the high Y1 value, resulting in poor oxidation resistance. In addition, since only petroleum isocyanate was used, the eco-friendly property was poor.

In addition, in the case of Comparative Examples 1B-2 and 1B-3 using an isocyanate prepolymer prepared by reacting a bio-polyol containing no anhydrosugar alcohol-alkylene glycol with TDI as an isocyanate component and in the case of Comparative Example 1B4 using an isocyanate prepolymer prepared by reacting a bio-polyol containing less than 1 part by weight of anhydrous alcohol-alkylene glycol with TDI as an isocyanate component, the eco-friendly property was high due to the high contents of raw materials derived biomass. However, since solids precipitated during the storage of the isocyanate prepolymer (i.e., poor storage stability), polyurethane foams prepared using these were not only in a poor foaming state, but also it was impossible to measure the hardness, tensile strength and elongation because it was impossible to form the foams, yellowing occurred with a high Y1 value and thus antioxidant properties were poor.

However, in the case of Examples 1B-2, 1B-4 and 1B-5, wherein an isocyanate prepolymer prepared by reacting a bio-polyol containing 1 part by weight or more of anhydrosugar alcohol-alkylene glycol with TDI was used as the isocyanate component, eco-friendly property was excellent, the foam state and the physical properties of the polyurethane foam was good, yellowing was reduced by reducing the Y1 value, and it can be confirmed that the anti-oxidation properties improved. In addition, in the case of Examples 1B-1 and 1B-3 using a mixture of TDI and an isocyanate prepolymer prepared by reacting a bio-polyol containing 1 part by weight or more of anhydrosugar alcohol-alkylene glycol with TDI as an isocyanate component, eco-friendly property, the foam state and physical properties of the polyurethane foam were excellent. Furthermore, yellowing was reduced by reducing the Y1 value, thereby improving the anti-oxidation properties.

TABLE 3

| Categories | | | Comparative example 1B-5 | Comparative example 1B-6 | Example 1B-6 | Example 1B-7 | Example 1B-8 | Example 1B-9 | Example 1B-10 |
|---|---|---|---|---|---|---|---|---|---|
| Component (parts by weight) | Polyol | TF-3000 | 100 | 100 | 100 | 100 | 100 | 100 | 100 |
| | Surfactant | L-580K | 1.0 | 1.0 | 1.0 | 1.0 | 1.0 | 1.0 | 1.0 |
| | Catalyst | L-33 | 1.1 | 1.1 | 1.1 | 1.1 | 1.1 | 1.1 | 1.1 |
| | Crosslinking agent | Ethylene glycol | 2.0 | 2.0 | 2.0 | 2.0 | 2.0 | 2.0 | 2.0 |
| | Blowing agent | Water | 2.75 | 2.75 | 2.75 | 2.75 | 2.75 | 2.75 | 2.75 |
| | Isocyanate | MDI | 59.9 | — | 30.0 | — | 30.0 | — | — |
| | | Comparative Example 1A-3 | — | 59.9 | — | — | — | — | — |
| | | Example 1A-5 | — | — | 33.5 | 67.0 | — | — | — |
| | | Example 1A-6 | — | — | — | — | 33.5 | 67.0 | — |
| | | Example 1A-8 | — | — | — | — | — | — | 67.0 |
| Properties | Isocyanate index | | 110 | 110 | 110 | 110 | 110 | 110 | 110 |
| | Cream time (sec) | | 10 | 11 | 11 | 12 | 11 | 12 | 11 |
| | Rise time (sec) | | 106 | 125 | 112 | 120 | 115 | 120 | 120 |
| | Density (kg/cm$^3$) | | 48.6 | Unmeasurable | 48.5 | 49.7 | 49.6 | 49.5 | 49.5 |
| | Health bubble | | Present | No present | Present | Present | Present | Present | Present |
| | Foam state | | Good | Bad | Good | Good | Good | Good | Good |
| | Tensile strength (kgf/cm$^2$) | | 3.9 | Unmeasurable | 3.5 | 3.7 | 3.9 | 4.0 | 3.8 |
| | Elongation (%) | | 103 | Unmeasurable | 100 | 109 | 105 | 102 | 101 |
| | YI value | | 18.24 | 20.45 | 11.51 | 4.77 | 13.54 | 6.44 | 17.44 |

The polyurethane foam specimens of Comparative Examples 1B-5 and 1B-6 are the polyurethane foam specimens foamed by using MDI which is a petroleum isocyanate as the isocyanate component (Comparative Example 1B-5), or using isocyanate prepolymer prepared by reaction of bio-polyol which does not contain anhydrosugar alcohol-alkylene glycol and MDI (Comparative Example 1B-6). The polyurethane foam specimens of Examples 1B-6 to 1B-10 are the polyurethane foam specimens foamed by using isocyanate prepolymer alone prepared by reacting MDI with a bio-polyol containing 1 part by weight or more of anhydrosugar alcohol-alkylene glycol as an isocyanate component (Examples 1B-7, 1B-9 and 1B-10), or using a mixture of the isocyanate prepolymers and MDI (Examples 1B-6 and 1B-8).

In Comparative Example 1B-5 using MDI which is petroleum isocyanate as an isocyanate component, the foam state and physical properties of the polyurethane foam were good, but yellowing occurred due to the high Y1 value, resulting in poor oxidation resistance. In addition, since only petroleum isocyanate was used, the eco-friendly property was poor.

In addition, in the case of Comparative Example 1B-6 using an isocyanate prepolymer prepared by reacting a bio-polyol containing no anhydrosugar alcohol-alkylene glycol with MDI as an isocyanate component, the eco-friendly property was high due to the high contents of raw materials derived biomass. However, since solids precipitated during the storage of the isocyanate prepolymer (i.e., poor storage stability), polyurethane foam prepared using this was not only in a poor foaming state, but also it was impossible to measure the tensile strength and elongation because it was impossible to form the foams, and yellowing occurred with a high Y1 value and thus antioxidant properties was poor.

However, in the case of Examples 1B-7, 1B-9 and 1B-10, wherein an isocyanate prepolymer prepared by reacting a bio-polyol containing 1 part by weight or more of anhydrosugar alcohol-alkylene glycol with MDI was used as the isocyanate component, eco-friendly property was excellent, the foam state and the physical properties of the polyurethane foam were good, yellowing was reduced by reducing the Y1 value, and it can be confirmed that the anti-oxidation properties improved. In addition, in the case of Examples 1B-6 and 1B-8 using a mixture of MDI and an isocyanate prepolymer prepared by reacting a bio-polyol containing 1 part by weight or more of anhydrosugar alcohol-alkylene glycol with MDI as an isocyanate component, eco-friendly property, the foam state and physical properties of the polyurethane foam were excellent. Furthermore, yellowing was reduced by reducing the Y1 value, thereby improving the anti-oxidation properties.

II. Preparation of an Isocyanate Prepolymer Prepared from Reaction of an Anhydrosugar Alcohol-Alkylene Glycol with a Polyisocyanate Compound and a Two-Component Type Composition for Forming a Polyurethane Foam Preparation of an isocyanate prepolymer Example 2A-1

A mechanical stirrer, condenser, nitrogen purge device and mantle to control internal temperature are installed in a 1.000 mL 4-neck reactor, TDI was weighed and internal temperature was maintained at 45° C. Then, ethylene oxide 5 mole adduct of isosorbide (trade name: IC52, manufacturer: IC Chemical, molecular weight: 365.47) with sufficient moisture removed in a vacuum oven were added dropwise using a dropping tunnel (at this time, it was added dropwise so that the internal temperature did not exceed 50° C. by heat generation). After completion of the dropwise addition, the internal temperature was raised to 60° C. and reacted for 2 hours to prepare an isocyanate prepolymer.

Example 2A-2

Other than using ethylene oxide 10 mole adduct of isosorbide (trade name: IC102, manufacturer: IC Chemical, molecular weight: 578.05) instead of ethylene oxide 5 mole adduct of isosorbide (trade name: IC52, manufacturer: IC Chemical, molecular weight: 365.47), an isocyanate prepolymer was prepared in the same manner as in Example 2A-1.

Example 2A-3

Other than using propylene oxide 5 mole adduct of isosorbide (trade name: IC59, manufacturer: IC Chemical, molecular weight: 432.37) instead of ethylene oxide 5 mole adduct of isosorbide (trade name: IC52, manufacturer: IC Chemical, molecular weight: 365.47), an isocyanate prepolymer was prepared in the same manner as in Example 2A-1.

Example 2A-4

Other than using propylene oxide 8 mole adduct of isosorbide (trade name: IC89, manufacturer: IC Chemical, molecular weight: 618.52) instead of ethylene oxide 5 mole adduct of isosorbide (trade name: IC52, manufacturer: IC Chemical, molecular weight: 365.47), an isocyanate prepolymer was prepared in the same manner as in Example 2A-1.

Preparing of Polyurethane Foam

Examples 21-1 to 2B-4 and Comparative Example 2B-1

According to the components and the content ratios shown in Table 4 below, the polyol, the catalyst, the surfactant and the blowing agent were mixed, and the mixture was sufficiently mixed for 1 to 3 minutes at a stirring speed of 3.000 rpm to prepare a polyol premix composition which is a first component of the two-component type composition for forming a polyurethane foam of the present invention.

A polyisocyanate component as a second component was added to the prepared polyol premix composition, followed by stirring at a stirring speed of 3,000 rpm for 7 to 10 seconds to prepare a two-component type composition for forming a polyurethane foam of the present invention.

A polyethylene film was laid in a box mold having a square of 250 mm×250 mm, and the polyurethane foam-forming composition prepared above was poured thereon. At this time, the reaction time was measured and recorded using a second clock to measure the cream time, the maximum volume rise time, and the gel time, and the health bubbles were observed. The heat of hardening reaction of the polyurethane foam was confirmed by the rod thermometer, and it confirmed that it was 120° C. Then, the physical properties of the prepared foam specimens were measured by the following evaluation method. The observation and physical property measurement results are shown in Table 4 below.

[Used Ingredients]
1) Polyol
PPG-3022: Trifunctional polyether polyol having an active hydrogen equivalent of 3,000 and a hydroxyl value of 54 to 58 mgKOH/g, PPG-3022 from Kumho Petrochemical
2) Amine-Based Catalyst
L-33: amine-based catalyst. Triethylenediamine/dipropylene glycol solution at 67 wt % concentration (TEDA L-33 from Tosoh Corporation)
A-1: Bis-(20 dimethylaminoethyl) ether/propylene glycol solution of 70 weight % concentration. Niax Catalyst A-1 from Momentive
3) Organometallic Catalyst
DBTDL: Organometallic Catalyst, Dibutyltin Dilaurate (Sigma Aldrich)
4) Silicone Surfactant
L-580K: Polyalkylene oxide methylsiloxane copolymer, Niax L-580K from Momentive
5) Blowing Agent
Water
6) Polyisocyanate Component
① T-80 (Comparative Example)
Toluene diisocyanate (TDI) (isomer ratio of 2,4-/2,6-=80:20), Lupranate T-80 from BASF, Korea
② SYC-T1: isocyanate prepolymer prepared in Example 2A-1
③ SYC-T2: isocyanate prepolymer prepared in Example 2A-2
④ SYC-T3: isocyanate prepolymer prepared in Example 2A-3
⑤ SYC-T4: isocyanate prepolymer prepared in Example 2A-4

TABLE 4

| | | | Comparative Example | Example | | | |
|---|---|---|---|---|---|---|---|
| Categories | | | 2B-1 | 2B-1 | 2B-2 | 2B-3 | 2B-4 |
| Component (parts by weight) | Polyol | PPG-3022 | 100 | 100 | 100 | 100 | 100 |
| | Surfactant | L-580 | 1.2 | 1.2 | 1.2 | 1.2 | 1.2 |
| | Catalyst | A-1 | 0.13 | 0.11 | 0.20 | 0.18 | 0.19 |
| | | L-33 | 0.5 | 0.5 | 0.5 | 0.5 | 0.5 |
| | | DBTDL | 0.15 | 0.17 | 0.10 | 0.15 | 0.10 |
| | Blowing agent | Water | 3.0 | 3.0 | 3.0 | 3.0 | 3.0 |
| | Isocyanate | T-80 | 37.68 | — | — | — | — |
| | | SYC-T1 | — | 50.28 | — | — | — |
| | | SYC-T2 | — | — | 50.56 | — | — |
| | | SYC-T3 | — | — | — | 50.56 | — |
| | | SYC-T4 | — | — | — | — | 50.98 |
| Properties | Isocyanate index | | 100 | 100 | 100 | 100 | 100 |
| | Cream time (sec) | | 11 | 13 | 12 | 12 | 11 |
| | Rise time (sec) | | 116 | 121 | 120 | 122 | 123 |
| | Gel time (sec) | | 89 | 153 | 144 | 154 | 156 |

TABLE 4-continued

| Categories | Comparative Example 2B-1 | Example 2B-1 | 2B-2 | 2B-3 | 2B-4 |
|---|---|---|---|---|---|
| Density (kg/cm³) | 34.7 | 34.6 | 37.0 | 37.8 | 38.8 |
| Hardness (25% · CLD)(kgf) | 7.2 | 7.0 | 7.5 | 8.3 | 8.6 |
| Health bubble | Present | Present | Present | Present | Present |
| Tensile strength (kgf/cm²) | 1.15 | 1.05 | 1.15 | 1.0 | 1.2 |
| Elongation (%) | 200 | 210 | 220 | 210 | 220 |
| Foam state | Good | Good | Good | Good | Good |
| YI value | 19.48 | 15.85 | 16.43 | 15.62 | 16.25 |

Description of the physical properties described in Table 4 is as follows.

Cream time (seconds): shows the time taken from when the polyurethane foam stock solution is mixed until the stock solution starts to swell, and it is important to find a balance because it is the part that finds optimum reactivity. The fast and slow of the cream time is not important, but the short cream time is preferable because the longer cream time can result in irregular foam formation (or cell formation). However, too short a cream time may result in poor mixing, so a suitable cream time (e.g., 7 to 14 seconds) is required.

Rise time (seconds): shows the time taken from when polyurethane foam stock solution is mixed until the stock solution reaches to the maximum swelling of the foam. Rise time is the part that finds optimum reactivity, and it is important to balance between gelling and blowing, so it is hard to say good or bad just because of the fast and slow rise time. If the rise time is fast, the foam collapses (decayed before the foamed foam hardens, usually due to an incorrect stock solution ratio or insufficient mixing of raw materials), and if it is too slow, foaming may not be possible due to gelling (foaming of foam is stopped) during foaming. Therefore, a suitable rise time (e.g., 108 seconds to 124 seconds) is required. "Unmeasurable" of rise time means that the composition (stock solution) does not swell and no foam is formed.

Gel time: shows the time taken from the time when the polyurethane stock solution is mixed to the time when the stock solution has a gel strength that can withstand a light impact and has a stable spatial shape-specifically, the time when at least three or four urethane fibers come out when a foam is poked in reaction with wooden chopsticks.

Health bubble: shows small bubbles that burst on the surface of the foam immediately after swelling to the maximum, and the presence of health bubble means that foam foaming is correct.

Foam state:
1) Good: The foam is blown (swollen), and it refers to a condition in which no collapse, cracks (cracking inside the foam due to the formation of the foam or external conditions after the formation) or shrinkages (a phenomenon wherein the gas trapped inside the foam is reduced to its original size by cooling) are apparent due to the gelling.
2) Bad: The foam does not form due to the bursting of cells while the foam is blowing.

Molding density: Measured according to ASTM D 1621.
Hardness: Measured according to KS M 6672.
Tensile strength: Measured according to KS M 6518.
Elongation: Measured according to KS M 6518.

YI value: Measured according to ASTM E313-96. The lower the YI value, the lower the yellowing phenomenon, and the better the anti-oxidation property.

According to Table 4, the specimens of Examples 2B-1 to 2B-4 comprising the polyol premix composition as the first component and the isocyanate prepolymer as the second component showed the same or a higher level of the foam state and physical properties of the foam, compared with the specimen of Comparative Example 2B-1 using general isocyanates (TDI) other than the isocyanate prepolymer of the present invention. In particular, since yellowing (YI value) was reduced, it was confirmed that the antioxidant properties were improved, compared with the specimen of Comparative Example 2B-1 using general isocyanates (TDI) other than the isocyanate prepolymer of the present invention.

III. Preparation of an Isocyanate Prepolymer Prepared from the Reaction of an Anhydrosugar Alcohol-Alkylene Glycol; a Lactic Acid Compound or a Caprolactone Compound; and a Polyisocyanate Compound and a Two-Component Type Composition for Forming a Polyurethane Foam <Preparation Example A> Preparation of Anhydrosugar Alcohol-Alkylene Glycol-Derived Lactate Derivatives Preparation Example 3A-1

190 g (538.5 mmol) of ethylene oxide 5 mole adduct of isosorbide (trade name: IC52, manufacturer: IC Chemical) with sufficient moisture removed, 248.4 g (1,723.1 mmol) of lactide and stannous octoate as an organometallic catalyst (content of 0.001% by weight of the total amount of the reaction mixture of IC52 and lactide) were placed in an autoclave of 450 ml, and the water and oxygen in the autoclave were minimized through nitrogen filling and degassing and then sealed. Subsequently, the mixture was dissolved at an internal temperature of about 100° C. for 30 minutes, then reacted at 135° C. for 5 hours, and cooled to obtain 434 g (yield: 99%) of an ethylene oxide 5 mole adduct of isosorbide-derived lactate derivative.

Preparation Example 3A-2

235 g (535.2 mmol) of propylene oxide 5 mole adduct of isosorbide (trade name: IC59, manufacturer: IC Chemical) with sufficient moisture removed, 200.5 g (1,391.5 mmol) of lactide and stannous octoate as an organometallic catalyst (content of 0.001% by weight of the total amount of the reaction mixture of IC59 and lactide) were placed in an autoclave of 450 ml, and the water and oxygen in the autoclave were minimized through nitrogen filling and degassing and then sealed. Subsequently, the mixture was dissolved at an internal temperature of about 100° C. for 30 minutes, then reacted at 135° C. for 8 hours, and cooled to obtain 435 g (yield: 99.9%) of a propylene oxide 5 mole adduct of isosorbide-derived lactate derivative.

<Preparation Example B> Preparation of Anhydrosugar Alcohol-Alkylene Glycol-Derived Caprolactate Derivative Preparation Example 3B-1

253 g (430.0 mmol) of ethylene oxide 10 mole adduct of isosorbide (trade name: IC102, manufacturer: IC Chemical) with sufficient moisture removed, 185.9 g (1,290.0 mmol) of caprolactone and stannous octoate as an organometallic catalyst (content of 0.005% by weight of the total amount of the reaction mixture of IC102 and caprolactone) were placed in an autoclave of 250 ml, and the water and oxygen in the autoclave were minimized through nitrogen filling and degassing, and then sealed. Subsequently, the mixture was dissolved at an internal temperature of about 100° C. for 30 minutes, then reacted at 140° C. for 24 hours, and cooled to obtain 435 g (yield: 99.2%) of an ethylene oxide 10 mole adduct of isosorbide-derived caprolactate derivative.

Preparation Example 3B-2

253 g (430.0 mmol) of propylene oxide 8 mole adduct of isosorbide (trade name: IC89, manufacturer: IC Chemical) with sufficient moisture removed, 185.9 g (1,290.0 mmol) of caprolactone and stannous octoate as an organometallic catalyst (content of 0.005% by weight of the total amount of the reaction mixture of IC89 and caprolactone) were placed in an autoclave of 250 ml, and the water and oxygen in the autoclave were minimized through nitrogen filling and degassing, and then sealed. Subsequently, the mixture was dissolved at an internal temperature of about 100° C. for 30 minutes, then reacted at 140° C. for 24 hours, and cooled to obtain 433 g (yield: 98.7%) of a propylene oxide 8 mole adduct of isosorbide-derived caprolactate derivative.

Preparation of Isocyanate Prepolymer

Example 3A-1: Preparation of TDI Prepolymer

A mechanical stirrer, condenser, nitrogen purge and mantle to control the internal temperature were installed in a 1.000 mL 4-neck reactor, and after careful weighing 670.0 g (3,846.1 mmol) of TDI, the reactor was maintained at 45° C., 200.0 g (256.4 mmol) of the ethylene oxide 5 mole adduct of isosorbide-derived lactate derivative of Preparation Example 3A-1 having a water content of 0.1 wt % or less (measured by using Karl Fischer moisture meter) by sufficiently removing water in a vacuum oven maintained at 75° C. to 78° C. were added dropwise using a dropping panel (at this time, it was added dropwise so that the internal temperature did not exceed 50° C. by heat generation). After completion of the dropwise addition, the internal temperature was raised to 60° C. and reacted for 2 hours to prepare an isocyanate prepolymer.

The reaction yielded 869.0 g (yield: 99.9%) of TDI prepolymer, and the 5 measured average NCO content of the TDI prepolymer was found to be 35.7±0.2.

Example 3A-2: Preparation of TDI Prepolymer

A mechanical stirrer, condenser, nitrogen purge and mantle to control the internal temperature were installed in a 1,000 mL 4-neck reactor, and after careful weighing 822.8 g (4,723.3 mmol) of TDI, the reactor was maintained at 45° C., 240.0 g (295.2 mmol) of the propylene oxide 5 mole adduct of isosorbide-derived lactate derivative of Preparation Example 3A-2 having a water content of 0.1 wt % or less by sufficiently removing water in a vacuum oven maintained at 75° C. to 78° C. were added dropwise using a dropping panel (at this time, it was added dropwise so that the internal temperature did not exceed 50° C. by heat generation). After completion of the dropwise addition, the internal temperature was raised to 60° C. and reacted for 3 hours to prepare an isocyanate prepolymer.

The reaction yielded 1,060.0 g (yield: 99.7%) of TDI prepolymer, and the 5 measured average NCO content of the TDI prepolymer was found to be 35.8±0.2.

Example 3A-3: Preparation of TDI Prepolymer

A mechanical stirrer, condenser, nitrogen purge and mantle to control the internal temperature were installed in a 1,000 mL 4-neck reactor, and after careful weighing 303.7 g (1,743.4 mmol) of TDI, the reactor was maintained at 45° C., 300.0 g (184.2 mmol) of the ethylene oxide 10 mole adduct of isosorbide-derived caprolactate derivative of Preparation Example 3B-1 having a water content of 0.1 wt % or less by sufficiently removing water in a vacuum oven maintained at 75° C. to 78° C. were added dropwise using a dropping panel (at this time, it was added dropwise so that the internal temperature did not exceed 50° C. by heat generation). After completion of the dropwise addition, the internal temperature was raised to 60° C. and reacted for 2 hours to prepare an isocyanate prepolymer.

The reaction yielded 599.5 g (yield, 99.3%) of TDI prepolymer, and the 5 measured average NCO content of the TDI prepolymer was found to be 35.6±0.2.

Example 3A-4: Preparation of TDI Prepolymer

A mechanical stirrer, condenser, nitrogen purge and mantle to control the internal temperature were installed in a 1,000 mL 4-neck reactor, and after careful weighing 299.7 g (1,720.4 mmol) of TDI, the reactor was maintained at 45° C., 340.0 g (187.8 mmol) of the propylene oxide 8 mole adduct of isosorbide-derived caprolactate derivative of Preparation Example 3B-2 having a water content of 0.1 wt % or less by sufficiently removing water in a vacuum oven maintained at 75° C. to 78° C. were added dropwise using a dropping panel (at this time, it was added dropwise so that the internal temperature did not exceed 50° C. by heat generation). After completion of the dropwise addition, the internal temperature was raised to 60° C. and reacted for 2 hours to prepare an isocyanate prepolymer.

The reaction yielded 637.8 g (yield, 99.7%) of TDI prepolymer, and the 5 measured average NCO content of the TDI prepolymer was found to be 35.4±0.1.

Preparing of Polyurethane Foam

Examples 3B-1 to 3B-4 and Comparative Example 3B-1

According to the components and the content ratios shown in Table 5 below, the polyol, the catalyst, the surfactant and the blowing agent were mixed, and the mixture was sufficiently mixed for 1 to 3 minutes at a stirring speed of 3.000 rpm to prepare a polyol premix composition which is a first component of the two-component type composition for forming a polyurethane foam of the present invention.

A polyisocyanate component as a second component was added to the prepared polyol premix composition, followed by stirring at a stirring speed of 3,000 rpm for 7 to 10 seconds to prepare a two-component type composition for forming a polyurethane foam of the present invention.

A polyethylene film was laid in a box mold having a square of 250 mm×250 mm, and the polyurethane foam-forming composition prepared above was poured thereon. At this time, the reaction time was measured and recorded using a second clock to measure the cream time, the maximum volume rise time and the gel time, and the health bubbles were observed. The heat of hardening reaction of the polyurethane foam was confirmed by the rod thermometer, and it confirmed that it was 120° C. Then, the physical properties of the prepared foam specimens were measured by the following evaluation method. The observation and physical property measurement results are shown in Table 5 below.

[Used Ingredients]

1) Polyol

TF-3000: Polyol other than anhydrosugar alcohols, trifunctional polyether polyols having an active hydrogen equivalent of 3.000 and a hydroxyl value of 54 to 58 mgKOH/g (Mitsui Chemicals & SKC Polyurethanes. TF-3000)

2) Amine-Based Catalyst

A-1: Amine-based catalyst. Bis-(20 dimethylaminoethyl) ether/propylene glycol solution of 70 weight % concentration. Niax Catalyst A-1 from Momentive L-33: Triethylenediamine/dipropylene glycol solution at 67 wt % concentration (TEDA L-33 from Tosoh Corporation)

3) Organometallic Catalyst

DBTDL: Organometallic Catalyst. Dibutyltin Dilaurate (Sigma Aldrich)

4) Silicone Surfactant

L-580K: Polyalkylene oxide methylsiloxane copolymer, Niax L-580K from Momentive

5) Blowing Agent

Water

6) Polyisocyanate Component

① T-80 (Comparative Example) Toluene diisocyanate (TDI) (isomer ratio of 2,4-/2,6-=80:20), Lupranate T-80 from BASF, Korea ② Example 3A-1: TDI prepolymer prepared in Example 3A-1

③ Example 3A-2: TDI prepolymer prepared in Example 3A-2

④ Example 3A-3: TDI prepolymer prepared in Example 3A-3

⑤ Example 3A-4: TDI Prepolymer prepared in Example 3A-4

Description of the physical properties described in Table 5 is as follows.

Cream time (seconds): shows the time taken from when the polyurethane foam stock solution is mixed until the stock solution starts to swell, and it is important to find a balance because it is the part that finds optimum reactivity. The fast and slow of the cream time is not important, but the short cream time is preferable because the longer cream time can result in irregular foam formation (or cell formation). However, too short a cream time may result in poor mixing, so a suitable cream time (e.g., 7 to 14 seconds) is required.

Rise time (seconds): shows the time taken from when polyurethane foam stock solution is mixed until the stock solution reaches to the maximum swelling of the foam. Rise time is the part that finds optimum reactivity, and it is important to balance between gelling and blowing, so it is hard to say good or bad just because of the fast and slow rise time. If the rise time is fast, the foam collapses (decayed before the foamed foam hardens, usually due to an incorrect stock solution ratio or insufficient mixing of raw materials), and if it is too slow, foaming may not be possible due to gelling (foaming of foam is stopped) during foaming. Therefore, a suitable rise time (e.g., 90 seconds to 124 seconds) is required. "Unmeasurable" of rise time means that the composition (stock solution) does not swell and no foam is formed.

Gel time: shows the time taken from the time when the polyurethane stock solution is mixed to the time when the stock solution has a gel strength that can withstand a light impact and has a stable spatial shape-specifically, the time when at least three or four urethane fibers come out when a foam is poked in reaction with wooden chopsticks.

Health bubble: shows small bubbles that burst on the surface of the foam immediately after swelling to the maximum, and the presence of health bubble means that foam foaming is correct.

Foam state:

1) Good: The foam is blown (swollen), and it refers to a condition in which no collapse, cracks (cracking inside the foam due to the formation of the foam or external conditions after the formation) or shrinkages (a phenomenon wherein the gas trapped inside the foam is reduced to its original size by cooling) are apparent due to the gelling.

2) Bad: The foam does not form due to the bursting of cells while the foam is blowing.

Molding density: Measured according to ASTM D 1621.

Air permeability (breathability): Measured according to ASTM D 3574-01. The higher the air permeability, the better the breathability.

Y1 value: Measured according to ASTM E313-96. The lower the Y1 value, the lower the yellowing phenomenon, and the better the anti-oxidation property.

TABLE 5

| | | | Comparative Example | Example | | | |
|---|---|---|---|---|---|---|---|
| Categories | | | 3B-1 | 3B-1 | 3B-2 | 3B-3 | 3B-4 |
| Component (parts by weight) | Polyol | TF-3000 | 100 | 100 | 100 | 100 | 100 |
| | Surfactant | L-580K | 1.2 | 1.2 | 1.2 | 1.2 | 1.2 |
| | Catalyst | A-1 | 0.26 | 0.26 | 0.31 | 0.32 | 0.32 |
| | | L-33 | 0.5 | 0.5 | 0.5 | 0.5 | 0.5 |
| | | DBTDL | 0.15 | 0.17 | 0.15 | 0.13 | 0.13 |

TABLE 5-continued

| Categories | | Comparative Example 3B-1 | Example 3B-1 | 3B-2 | 3B-3 | 3B-4 |
|---|---|---|---|---|---|---|
| Blowing agent | Water | 3.0 | 3.0 | 3.0 | 3.0 | 3.0 |
| Polyisocyanate component | T-80 | 37.68 | — | — | — | — |
| | Example 3A-1 | — | 50.98 | — | — | — |
| | Example 3A-2 | — | — | 51.41 | — | — |
| | Example 3A-3 | — | — | — | 50.84 | — |
| | Example 3A-4 | — | — | — | — | 51.12 |
| Properties | Isocyanate index | 100 | 100 | 100 | 100 | 100 |
| | Cream time (sec) | 11 | 10 | 11 | 10 | 9 |
| | Rise time (sec) | 69 | 104 | 108 | 107 | 92 |
| | Gel time (sec) | 89 | 158 | 143 | 173 | 148 |
| | Density (kg/cm$^3$) | 26.5 | 28.2 | 28.9 | 30.1 | 32.7 |
| | Health bubble | Present | Present | Present | Present | Present |
| | Foam state | Good | Good | Good | Good | Good |
| | Air permeability at 120° C. curing (m$^3$/min) | 0.016 | 0.021 | 0.018 | 0.019 | 0.017 |
| | Air permeability at 160° C. curing (m$^3$/min) | 0.024 | 0.032 | 0.029 | 0.031 | 0.028 |
| | YI value at 120° C. curing | 19.48 | 4.69 | 5.19 | 5.04 | 6.07 |
| | YI value at 160° C. curing | 66.40 | 57.37 | 58.14 | 57.68 | 59.65 |

According to Table 5, the polyurethane specimens of Examples 3B-1 to 3B-4 comprising the polyol premix composition as the first component and the isocyanate prepolymer as the second component showed the same or a higher level of the foam state and physical properties of the foam, compared with the specimen of Comparative Example 3B-1 using petroleum isocyanates (TDI) other than the isocyanate prepolymer of the present invention. In particular, in terms of air permeability (breathability) and Y1 value (antioxidation property), it can be seen that the polyurethane specimens of Examples 3B-1 to 3B-4 are significantly improved compared to the polyurethane specimen of Comparative Example 3B-1.

Scanning electron micrographs of the internal cell structures of the polyurethane specimens prepared in Comparative Example 3B-1 and Example 3B-1 are shown in FIG. 1, and it can be seen that the breathability of Example 3B-1 is improved compared to Comparative Example 3B-1 by the cell opening effect.

On the other hand, as shown in Table 5, since the curing temperature in the actual process is raised to 160° C. or more, the polyurethane foam specimens of Comparative Example 3B-1 and Examples 3B-1 to 3B-4 were post-cured in an oven at 160° C. for 2 hours to confirm air permeability (breathability) change, and an increase in high breathability compared to breathability at 120° C. was observed due to the cell opening effect. Also in this case, it can be seen that the breathability of the polyurethane specimens of Examples 3B-1 to 3B-4 was remarkably improved compared to that of the polyurethane specimens of Comparative Example 3B-1.

In addition, since the curing temperature in the actual process rises to 160° C. or higher, after the polyurethane foam specimens of Comparative Example 3B-1 and Examples 3B-1 to 3B-4 were post-cured in an oven at 160° C. for 2 hours, the Y values were measured. In comparison, it can be seen that the Y values of the polyurethane specimens of Examples 3B-1 to 3-4 decreased compared to that of the polyurethane specimen of Comparative Examples 3B-1. That is, when the isocyanate prepolymer according to the present invention was used, the Y1 value was decreased, indicating that the anti-oxidation property was improved.

The invention claimed is:

1. An isocyanate prepolymer prepared from the reaction of a polyol with a polyisocyanate compound, wherein the polyol comprises 5 to 50 parts by weight of anhydrosugar alcohol-alkylene glycol and 50 to 95 parts by weight of bio-polyol other than the anhydrosugar alcohol-alkylene glycol based on 100 parts by weight of the total polyol, and the bio-polyol other than the anhydrosugar alcohol-alkylene glycol comprises dimer acid-based bio-polyols.

2. An isocyanate prepolymer prepared from the reaction of an anhydrosugar alcohol-alkylene glycol-derived lactate derivative or anhydrosugar alcohol-alkylene glycol-derived caprolactate derivative; and a polyisocyanate compound.

3. The isocyanate prepolymer according to claim 1, wherein the anhydrosugar alcohol-alkylene glycol is an adduct obtained by reacting an alkylene oxide with a hydroxyl group(s) at both terminals or one terminal of the anhydrosugar alcohol.

4. The isocyanate prepolymer according to claim 3, wherein the anhydrosugar alcohol is selected from the group consisting of isosorbide, isomannide, isoidide or combinations thereof, and the alkylene oxide is selected from the group consisting of ethylene oxide, propylene oxide or a combination thereof.

5. The isocyanate prepolymer according to claim 1, wherein the polyisocyanate compound is selected from the group consisting of methylene diisocyanate, ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3-diisocyanate, cyclohexane-1,4-diisocyanate, isophorone diisocyanate, 2,4-hexahydrotoluene diisocyanate, 2,6-hexahydrotoluene diisocyanate, dicyclohexylmethane-4,4'-diisocyanate (HMDI), 1,3-phenylene diisocyanate, 1,4-phenylene diisocyanate, 2,4-toluene diisocyanate, 2,6-toluene diisocyanate, diphenylmethane-2,4'-diisocyanate, diphenylmethane-4,4'-diisocyanate, polydiphenylmethane diisocyanate (PMDI), naphthalene-1,5-diisocyanate or a combination thereof.

6. An isocyanate prepolymer composition comprising a first isocyanate prepolymer prepared from the reaction of a polyol containing an anhydrosugar alcohol-alkylene glycol with a polyisocyanate compound; and a second isocyanate prepolymer prepared from the reaction of a polyol containing a bio-polyol other than anhydrosugar-alkylene glycol with a polyisocyanate compound, wherein the bio-polyol other than the anhydrosugar alcohol-alkylene glycol comprises dimer acid-based bio-polyols.

7. The isocyanate prepolymer composition according to claim 6, wherein the content of the first isocyanate prepolymer is 1 to 99 parts by weight based on 100 parts by weight of the total amount of the first isocyanate prepolymer and the second isocyanate prepolymer.

8. A two-component type composition for forming a polyurethane foam, comprising a polyol premix composition as a first component; and a polyisocyanate as the second component, wherein the polyisocyanate comprises the isocyanate prepolymer according to claim 1.

9. The two-component type composition for forming a polyurethane foam according to claim 8, wherein the polyol premix composition comprises a polyol, a catalyst, a surfactant and a blowing agent.

10. The two-component type composition for forming a polyurethane foam according to claim 9, wherein the catalyst is selected from the group consisting of an organometallic catalyst, an amine catalyst or a combination thereof.

11. The two-component type composition for forming a polyurethane foam according to claim 10, wherein the organometallic catalyst is an organotin catalyst and the amine catalyst is a tertiary amine catalyst.

12. The two-component type composition for forming a polyurethane foam according to claim 9, wherein the surfactant is a silicone-based surfactant.

13. The two-component type composition for forming a polyurethane foam according to claim 9, wherein the blowing agent is selected from the group consisting of water, methylene chloride, n-butane, isobutane, n-pentane, isopentane, dimethylether, acetone, carbon dioxide or a combination thereof.

14. The two-component type composition for forming a polyurethane foam according to claim 8, wherein the first component or the second component further comprises an auxiliary additive selected from the group consisting of a flame retardant, a colorant, a UV stabilizer, a thickener, a foam stabilizer, a filler or a combination thereof.

15. A method for preparing a polyurethane foam, comprising a step of mixing and reacting a polyol premix composition as a first component and a polyisocyanate as a second component, wherein the polyisocyanate comprises the isocyanate prepolymer according to claim 1.

16. The isocyanate prepolymer according to claim 2, wherein the anhydrosugar alcohol-alkylene glycol-derived lactate derivative is prepared by a reaction of an anhydrosugar alcohol-alkylene glycol and a lactic acid compound and the anhydrosugar alcohol-alkylene glycol-derived caprolactate derivative is prepared by a reaction of an anhydrosugar alcohol-alkylene glycol and caprolactone compound, and the anhydrosugar alcohol-alkylene glycol is an adduct obtained by reacting an alkylene oxide with a hydroxyl group(s) at both terminals or one terminal of an anhydrosugar alcohol.

17. The isocyanate prepolymer according to claim 2, wherein the polyisocyanate compound is selected from the group consisting of methylene diisocyanate, ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3-diisocyanate, cyclohexane-1,4-diisocyanate, isophorone diisocyanate, 2,4-hexahydrotoluene diisocyanate, 2,6-hexahydrotoluene diisocyanate, dicyclohexylmethane-4,4'-diisocyanate (HMDI), 1,3-phenylene diisocyanate, 1,4-phenylene diisocyanate, 2,4-toluene diisocyanate, 2,6-toluene diisocyanate, diphenylmethane-2,4'-diisocyanate, diphenylmethane-4,4'-diisocyanate, polydiphenylmethane diisocyanate (PMDI), naphthalene-1,5-diisocyanate or a combination thereof.

18. A two-component type composition for forming a polyurethane foam, comprising a polyol premix composition as a first component; and a polyisocyanate as the second component, wherein the polyisocyanate comprises the isocyanate prepolymer according to claim 2.

19. A two-component type composition for forming a polyurethane foam, comprising a polyol premix composition as a first component; and a polyisocyanate as the second component, wherein the polyisocyanate comprises the isocyanate prepolymer composition according to claim 6.

* * * * *